United States Patent [19]

King et al.

[11] Patent Number: 5,006,743
[45] Date of Patent: Apr. 9, 1991

[54] MULTIPLE COMPARTMENTED DYNAMOELECTRIC MACHINE

[75] Inventors: James L. King; Robert E. Lykes, both of Troy, Ohio

[73] Assignee: A. O. Smith Corporation, Milwaukee, Wis.

[21] Appl. No.: 427,441

[22] Filed: Oct. 26, 1989

[51] Int. Cl.$^5$ ............................................. H02K 5/22
[52] U.S. Cl. ....................................... 310/89; 310/42
[58] Field of Search ................. 310/87, 89, 90, 42, 310/63, 66

[56] References Cited

U.S. PATENT DOCUMENTS

| | | | |
|---|---|---|---|
| 3,371,236 | 2/1968 | Swanke | 310/89 |
| 3,484,633 | 12/1969 | Stecher | 310/90 |
| 4,172,695 | 10/1979 | Uesugi | 417/424 |
| 4,614,904 | 9/1986 | Yamazaki et al. | 310/87 |
| 4,841,183 | 6/1989 | Dohogne et al. | 310/90 |

*Primary Examiner*—Steven L. Stephan
*Assistant Examiner*—D. Rebsch
*Attorney, Agent, or Firm*—Andrus, Sceales, Starke & Sawall

[57] ABSTRACT

A motor includes a round tubular steel frame with a stator unit fixedly mounted therein and spaced from the frame ends. Spaced bearing frames are secured within the round frame and support a rotor unit within the stator unit and in the bearing frames. One or both bearing frames are spaced from the round frame ends, and define corresponding auxiliary compartments. In a motor pump unit, an end plate closes one end and defines a control compartment. The pump housing closes the opposite end and forms a fan and drip compartment within the round frame. The round frame has openings in the drip compartment to by-pass pump water leakage from the motor compartment. A fan in the fan compartment provides motor cooling. Motor controls such as power connectors, a centrifugal start switch unit, electronic timers, and the like are mounted within the control compartment to form a self-contained motor. The motor compartment and various auxiliary compartments can be formed within the frame by appropriate securing of the bearing frames and internal walls in the round frame. Thus, two and three compartment modular motor are formed with one or more internal wall structures secured directly to the round motor frame.

2 Claims, 2 Drawing Sheets

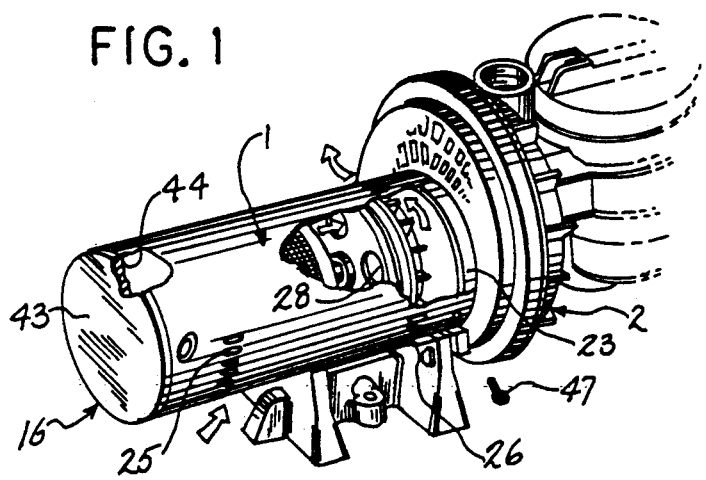
FIG. 1
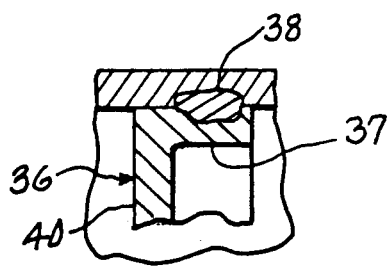
FIG. 2
FIG. 2A

MULTIPLE COMPARTMENTED DYNAMOELECTRIC MACHINE

BACKGROUND OF THE PRESENT INVENTION

This invention relates to a multiple compartmented dynamoelectric machine, and particularly a dynamoelectric machine having a main electromagnetic compartment in combination with one or more auxiliary component compartments formed in a self-contained assembly with a single outer main machine frame.

Different dynamoelectric machines, such as rotary electric motors, have a common basic motor construction with significantly different operating specifications adapted to various particular applications. Generally, a rotary electric motor includes a stationary stator unit and a rotating rotor unit. The stator unit is conventionally an annular unit with a cylindrical rotor unit rotatably mounted therein. The stator unit is mounted within a rigid supporting tubular round main frame. Opposite ends of the main frame are closed by end bearing plates or frames which are precisely formed and secured to the round frame to locate a rotor bearing in a precise coincidence with the axis of the opening of the annular stator. The rotor unit includes a supporting shaft journaled within the bearings in the end bearing frames to rotatably support the rotor. The rotor shaft projecting from at least one end bearing frame for coupling to a load device. Different applications and specifications generally require particular controls as well as particular mounting and couplings for adapting the motor to the particular application. Various controls, such as a centrifugal switch current and temperature sensing devices, a terminal board and the like are mounted within an end of the frame, or in a separate control box and coupled to the motor. Centrifugal switches and second devices may be mounted within the motor's frame structure and connected to suitable external controls for controlled energizing of the motor. The external controls may include various manual and automated control units. Other applications may require forced cooling and a fan unit may be mounted separately or within the motor to create an air flow through the motor.

In current practice, electronic controls are available and widely used in controlling of the motors in response to external sense controls. A typical example is a fractional horsepower motor connected to operate ventilating and fan devices and particularly water or liquid motor-pump devices for use in whirlpools, spas, tubs, jet devices and the like. The controls may be made to respond to the surrounding environment, and are normally or advantageously protected from the surrounding environment. The controls however should be conveniently accessible for monitoring and survicing of the control systems. A particularly practical control housing system is disclosed in the co-pending application of James L. King, entitled "Electric Motors Having Integrated Control Housing And Method Of Fabrication", filed on Feb. 6, 1989 with Ser. No. 07/306,887. As more fully disclosed in the above application, the motor structure is formed with a conventional stator and motor. A cup-shaped end cap is secured to the closed end bearing frame of the motor and specially coupled thereto to form a control compartment immediately adjacent to the end frame of the motor. Electronic and other control compounds are housed in such compartment, preferably by attachment to the end cap. A basically standard motor can then be provided with a custom designed control located within the end compartment. Basic sized end caps can be provided to accommodate different complexities and components required for different control systems.

In addition, applications may require certain specialized motor constructions for adaptation to a load device. For example, motor driven pump units are often constructed with the motor directly mounted to the pump device. The pump motor is preferably a round motor with a smooth continuous exterior surface to establish an attractive as well as attractice unit for use in spas and like devices. Special consideration must be given to any possible leakage of liquid from the pump unit entering into the motor structure. Thus, the electrical winding of a motor will be damaged, if not destroyed, in the presence of unacceptable liquid contact. Further, the mechanical components, such as the bearings and support structure can be adversely affected by liquids, particularly water and the like. A standard motor pump construction includes a drip compartment between the motor components and the pump. The drip compartment is formed by an extension of a standard pump mounting flange structure to which the motor frame is mounted such that any liquid which escapes from the pump unit along the motor shaft connection discharges into the pump drip compartment. Appropriate openings in the drip compartment discharge the liquid and thereby bypass the liquid from the motor.

In many applications, the motor requires a forced ventilation and cooling. A fan may be mounted on and coupled to the either end of the motor shaft within the annular frame and provide forced air flow through the motor.

Motor controls for a pump driven device will have various electronic controls in modern-day practice. For example, motor driven pump units are widely used for pumping of water in whirlpools, spas and other like tubs. The pumping action will vary with time and require different pumping levels. In addition, various safety factors must be considered in view of the danger of operating electrical devices while in a body of water. Generally, the prior art and commercial development retains a rather conventional approach used over the many years of electric rotary motor development wherein the motors are either specially constructed for an application or the load device and is specially constructed to accommodate and receive the basis motor unit. The above identified co-pending application discloses a particularly advantageous control system and one modular construction of and electric motor which permits custom assembly of the motor for various applications and avoids the fabrication of special motor construction for each specification.

There is a need for a modular design incorporating a basic electromagnetic motor structure which can be readily adapted to various motor specifications and applications. The design should permit application to existing commercial loads and application that presently include special housing and mounting frame constructions and the like.

SUMMARY OF THE INVENTION

The present invention is particularly directed to a modular motor structure constructed with a basic electromagnetic structure part and including an annular magnetic stator core and winding unit in combinations with a cylindrical magnetic rotor and winding unit. The rotor unit includes a shaft rotatably mounted within a motor end frame system including end bearing support plates. Generally, in accordance with a teaching of the present invention, the motor includes a singular tubular round frame member formed of an appropriate rigid supporting material with the stator unit fixedly mounted therein and with the round frame member projecting from the opposite ends of the core and winding unit. The round frame member has a length substantially in excess of the spacing between the bearing end frame members which are secured within the round frame in appropriate spaced relation to support the rotor unit and with the round frame projecting from one or both of the end bearing frame members and defining at least one auxiliary compartment. The auxiliary compartment is closed by an end plate member secured to the open end of the round frame to define at least two separate compartments or compartments including the motor compartment within the round motor frame to which the stator unit is fixedly secured and an adjacent compartment with the round motor frame for controls or other auxiliary motor parts or components.

More particularly, in accordance with one aspect or embodiment of the invention, a round motor frame is provided with the stator unit located substantially centrally within said frame and with the frame projecting axially outwardly from the opposite ends of the stator core unit. End bearing frame members are press fitted and secured within the round motor frame in accordance with the required bearing spacing for the shaft structure of the rotor unit, and with the end frame members spaced inwardly from the opposite end of the round frame member. The end frame members define an internal motor compartment within which the electromagnetic motor structures including the stator core unit and the rotor unit are located, with the rotor unit appropriately rotatably mounted in the bearings in the internally located bearing end plates. The motor shaft is journalled in the bearings with the shaft terminating within the one bearing unit and projecting outwardly from the opposite second bearing unit, and generally extending from the round frame to provide for load interconnection.

As applied to a motor-driven pump assembly, the pump unit is secured to the extended shaft end of the motor frame and serves to close the motor frame and define an internal compartment between the pump housing and the inwardly spaced end bearing frame member. The round frame is advantageously provided with openings to define a drip compartment between the motor compartment and the pump unit to by-pass water leakage from the pump from the motor. A fan member is mounted within such auxiliary end compartment to provide cooling of the motor under operating conditions.

The opposite end of the round motor frame is closed by an end cap which defines an internal control compartment between the end cap and the adjacent but spaced bearing frame member. The control compartment may, for example, include any suitable controls winding connectors, motor controls and the like. Typically in a pump unit, a centrifugal switch actuator and starter switch may be mounted within the control compartment and coupled to the shaft for controlling the starting of a capacitor start motor.

Other variations of the motor structure are readily provided by locating of the motor compartment within the round frame and defining one or more appropriate auxiliary compartments within the frame by the appropriate mounting and securing of end and internal wall members.

In alternate systems for example, the motor compartment may be located adjacent one end of the round motor frame and an auxiliary control or component compartment formed to the extended end of the motor frame. In such structures, a single internal bearing frame is secured within the round frame to separate the motor compartment from the auxiliary compartment and the opposite bearing frame is secured to close the end of the round frame. In still other structure it may be desirable to provide the motor compartment adjacent one end of the round motor frame with a first component compartment adjacent the motor compartment and a second compartment located adjacent the opposite outer end of the frame. Again, the various compartments are formed by the internal mounting of a bearing end frame and a second separating wall within the round frame in combination with the end closure members including in the described instance an end closure cap and an end bearing frame.

Although described particularly with respect to a two and three compartment construction, any desired number of compartments can be provided within the broadest aspects of this invention.

Thus, the present invention is particularly directed to the construction of a modular basic design for a motor including a single main motor frame supporting the stator unit and projecting from at least one end thereof in combination with end bearing frames secured appropriately to the round motor frame to define a motor structure in combination with one or more internal auxiliary compartments all within the round motor frame. The self-contained machine thus includes only the main round frame and at least one of the bearing frames and an auxiliary plate or wall member secured within and to the round frame. The motor construction including the internal wall and end bearing frame members provides a particular construction with an unblemished and smooth motor frame, and essentially without visible sign of attachment of the bearing frame members and/or other wall defining structures. The integrated frame structure internally of the round frame provides a stand-alone and self-contained motor which does not require any external structural support. The internally mounted walls and bearing structures provides a smooth round motor frame having the end bearing frames totally within the round frame and thereby provides a readily constructed and particular estheically pleasing and appealing structure. The latter factor is of considerable significance in connection with various retail devices sold for home consumption, such as whirlpools, spas and the like.

The dynamoelectric machine of the present invention is readily fabricated in accordance with known manufacturing systems and provides a reliable motor construction which can be mass produced at a cost effective procedure and fabricating process. In the spa, whirlpool and other tub businesses, the cost is of a very significant factor because of the competitive nature of the business in the marketplace. However, care must be taken to provide a long, reliable life and thus requires a rugging construction. Further, servicing and handling of the motor during its use as well as for replacement must be effectively provided.

BRIEF DESCRIPTION OF THE DRAWINGS

The drawings furnished herewith illustrate the best mode presently contemplated for the invention and are described hereinafter.

In the drawings:

FIG. 1 is a pictorial view of a motor driven pump unit incorporating a motor constructed in accordance with the teaching of the present invention;

FIG. 2 is an enlarged side view with the upper portion in axial sectional of a motor such as illustrated in FIG. 1;

FIG. 2A is an enlarged fragmentary view of a welded connection shown in FIG. 2;

DESCRIPTION OF THE ILLUSTRATED EMBODIMENT

Figure 3:
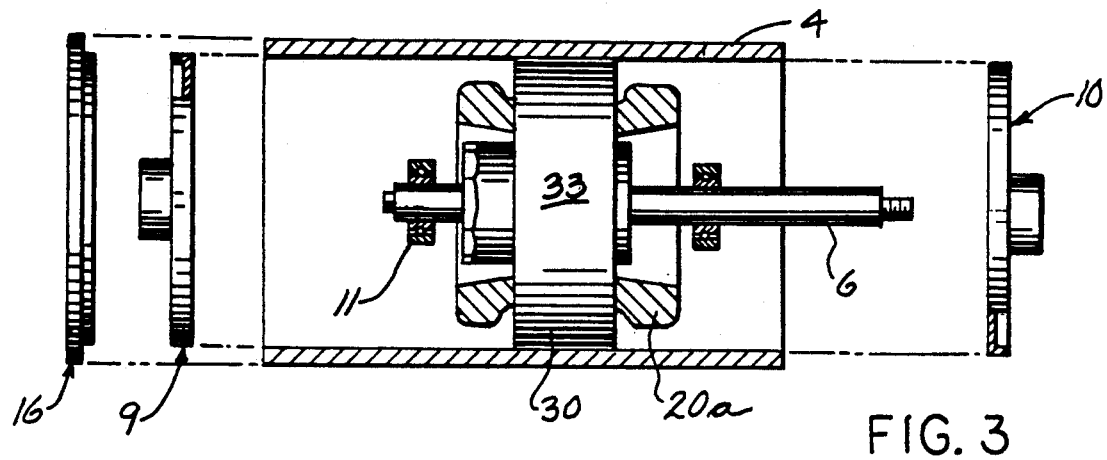
FIG. 3 is an exploded view of the motor components illustrated in FIGS. 1 and 2.

Referring to the drawings and particularly to FIGS. 1 and 2, a motor driven pump unit is illustrated including an electric motor 1 constructed in accordance with the present invention and mounted to a pump unit 2 for pumping of water and the like. The illustrated motor-driven pump unit is a typical unit such as used in spas and similar tub-like units for retail distribution. The electric motor 1 generally includes an electromagnetic structure corresponding to well known designs and constructions. In particular, an annular stator unit 3 is fixedly mounted within a tubular round motor frame 4, which projects axially from the opposite ends of the annular stator unit 3. A cylindrical rotor unit 5 is located within the stator unit 3. The rotor unit 5 includes a shaft 6, with one end terminating within the motor frame 4 and the opposite end projecting outwardly of the opposite end of the frame 4 and interconnected to the pump unit 2, as at 8. The opposite ends of the shaft 6 are journalled in end bearing frames 9 and 10, respectively, secured within the motor frame 4. The frames 9 and 10 are similarly constructed and secured in place to precisely locate the bearing frames in accordance with the motor and shaft design. Each end frame 9 and 10 includes a similar bearing 11, and 12, respectively. The internal shaft end terminates within its bearing 11 and bearing plate 9 while the opposite shaft end projects through from the bearing 12 and bearing plate or frame 10 for coupling the pump unit 2. The round motor frame 4 in combination with bearing frames 9 and 10 defines three different compartments including a motor compartment 13 within which the electromagnetic motor structures are secured or mounted and contained. An auxiliary compartment 14 is shown within the frame 4 adjacent to the bearing frame 9, and is shown as a control compartment for receiving various control elements for operating of the motor, as more fully described hereinafter. The extension of the frame 4 from the opposite end of the motor compartment 13 defines a second auxiliary compartment 15 shown as a fan and drip compartment, also more fully discussed hereinafter. The auxiliary compartments 14 and 15 are closed respectively at the opposite ends of the frame 4 to provide appropriate enclosure of the elements and components.

Thus, referring particularly to the auxiliary compartment 14, the compartment is closed by an end cap 16, shown releasably secured to the motor frame 4, and defining an essentially closed outer wall. Cap 16 may be formed of metal, plastic or other suitable material. When formed of metal, a stamped or drawn cap creates a low cost unit which can form a pleasing outer end to the motor. The various controls or other components can be located within compartment 14 and mounted to the several walls defining the same. A centrifugal switch unit 17 is shown mounted within the compartment 14 and appropriately secured to a mounting bracket 17a on the interior wall of the round frame 4. A centrifugal actuator 18 is secured to the end of the shaft 7 in operative relation to the centrifugal switch unit 17 for selectively closing and opening of motor start contacts 19 in response to the rotation of the rotor unit. A capacitor 20 is shown mounted within the compartment 14 and is connected in circuit with switch 19 and the stator winding 20a through any suitable connecting means. Capacitor 20 may be mounted to the exterior of end frame 9 as an alternative to mounting to cap 16 or frame 4, as shown. An electronic control unit 21 is also illustrated secured to the end closure cap 16 and provides for a control input such as more fully disclosed in the previously identified co-pending application of King et al. Thus, the control compartment or chamber is formed internally of the single extended main round frame 4 between the outer end cap 16 and the internal bearing plate or frame 9 to receive and enclose the several components for controlling the motor operation.

The opposite end auxiliary compartment 15 through which the load connecting end of shaft 6 projects is illustrated as a combined fan and drip chamber or compartment.

The pump unit 2 includes an outer housing 22 with a mounting flange 23 which abuts the end of the frame 4 to close the compartment 15. A rotating pump impeller 23a is located within the pump housing 22 and is coupled to the motor shaft 6 as at 8 for operation in response to energization of the motor. A fan unit 24 is secured to the shaft 6 immediately adjacent to the bearing structure 12 and the end bearing plate or frame 10. The fan unit 24 is suitably coupled to the shaft 6 as by a suitable press fit or the like and rotates with the shaft.

The motor frame 4 is illustrated having circumferentially distributed slots 25 located immediately outwardly from the end bearing plate 9. Similar circumferentially distributed slots or openings 26 are also provided in the frame 4 in alignment with the auxiliary compartment 15 and particularly aligned with the fan unit 24. End bearing frame 9 includes openings 27 and end plate 10 includes openings 28 to provide an air flow path through the motor with the air moving inwardly through slots 25 passing through the motor compartment 13 and exiting from the slots 26 in auxiliary compartment 15. In addition, any water leakage from the pump unit 2 along the shaft 6 is discharged through the auxiliary compartment 15 and slots 26.

Thus, the embodiment of the invention illustrated in FIGS. 1-3 discloses a three compartment motor including a basic electromagnetic motor unit compartment 13, a control compartment 14 and a fan chamber or compartment 15, as defined by combination of the round motor frame 4, the end bearing plates or frames 9 and 10 with the end cap 16 and the mounting flange 23 of pump unit 2.

The cap 16 and pump flange 23 close the opposite ends of the motor frames 4. With the cap 16 located within the frame 4 as shown, a continuous round motor structure is presented interconnected to the pump unit 2 to provide an esthetically pleasing and desirable motor structure particularly adapted for spas and similar applications.

The motor structure may use standard components which are formed with well known standard technology to establish and maintain a cost effective motor for application in environments where cost is a significant factor.

More particularly and with reference to FIG. 2, the electromagnetic structure is of an essentially standard construction and design. The stator unit 3 includes an annular stator core 30 having a cylindrical or round outer surface defining a close fitting interface 31 with the interior surface of the frame 4. The core is firmly affixed to and supported by the frame 4. Stator winding 20a is wound within appropriate slots, not shown, in the interior surface of the stator core 30 and projects outwardly from the opposite end faces of the stator core 30. Winding 20a is spaced from the motor bearing plates 9 and 10. The illustrated rotor unit 5 is similarly a standard design including a cylindrical magnetic core 33 aligned with stator core 30. A conventional cast winding 34 is embedded within the core 33. The shaft 6 extends through the core 33 with the opposite ends projected into the bearing end plates 9 and 10 as previously described.

The electromagnetic structure is totally confined and located within the motor compartment 13, as defined by the end bearing plates or frames 9 and 10. The bearing frames are identically constructed and bearing plate 9 is particularly described as follows.

The bearing frame 9 includes a flat end plate or wall 36 with the air flow openings 27. The wall 36 is integrally formed with an outer annular lip or flange 37. The frame 9 with flange 37 is preferably constructed and attached in accordance with the teaching of the co-pending application entitled "Dynamoelectric Machine With Internal Walls and Method Of Fabricating Thereof" of Richard E. Lykes et al and filed on even date herewith. As more fully discussed therein, the flange 37 has a controlled outer diameter establishing a close fit within the frame 4 for accurate location within the frame and for interconnection thereto in any suitable manner. The flange 37 preferably includes a plurality of circumferentially distributed radial offsets, not shown, and the flange is secured to the frame 4 by appropriate interface welds 38 at each offset. Various other connections are disclosed in the above referenced application. The end wall 37 consists of a plurality of substantially flat plate member 40 interconnecting the outer lip 37 with an internal tubular bearing portion 41, within which the bearing 11 is secured. The end frame structure provides a rigid and fixed support for the rotor unit 5 to absorb the various mechanical and electromagnetic loads exerted on the rotor. The rotor unit 5 is thereby accurately located within the stator unit 3 with a minimal air gap 42 between the stator and rotor cores 30 and 33 in accordance with the generally desired motor construction.

The control compartment 14 is defined by the end bearing plate 9 and the cap 16. Cap 16 is shown including an outer flat closure wall 43 and a cylindrical flange or lip 44 which telescopes into the end of the motor frame 4. The lip 44 is preferably constructed to establish a close fit within the frame 4 with a releasable connection to permit access to the parts within compartment 14. The cap 16 is shown secured in place by small set screws 44a which pass through recessed openings in frame 4 and thread into openings in lip 44.

The pump unit 2 is specially constructed with the annular mounting flange 23 having a diameter slightly less than the internal diameter of the round frame 4. A plastic wrap 46 is molded into the pump housing flange and extends outwardly to define the pump housing connector. The motor frame 4 is secured to the pump housing flange in any suitable manner such as by securement bolts 47, or the like. The frame can of course be spot welded or otherwise secured to the pump housing flange but is preferably releasably mounted for access to the fan unit. The pump housing closes the end of the fan and drip compartment 15. Thus, any water which leaks from the pump unit 2 along the shaft toward the motor unit will be discharged into and from the fan and drip compartment.

If forced cooling of the motor 1 is not necessary, the fan unit 24 may be eliminated. The compartment 15 is retained as the drip compartment to prevent leakage of liquid from the pump unit 2 entering into the motor compartment 13. Similarly, if the motor specification does not require control but cooling is desired, the fan may be mounted within the illustrated control compartment 14 and the compartment 15 retained for discharging water leakage from the pump unit.

For other than pump applications and the like, the drip compartment may of course be totally eliminated. In the various permutations of compartments, the length of round frame 4 is of course selected to provide for the necessary number and depth of compartments in addition to the motor compartment.

The motor structure may also be constructed with the internal bearing frame and the extended main frame to form an auxiliary compartment at the load end. The opposite end of the motor main frame may be closed by a conventional bearing frame or a pressed-in-place bearing frame in combination with a separate canopy or housing of cup-shaped configuration to add a control compartment to the outer end of the motor.

In such structure, the round main frame 4 can be fabricated as in any known desired manner of a suitable material such as an appropriate steel. The bearing frames 9 and 10 are preferably formed as stamped steel members with the flanges for press fitting within the housing or frame 4, as more fully discussed in the Lykes et al application.

Figure 4:
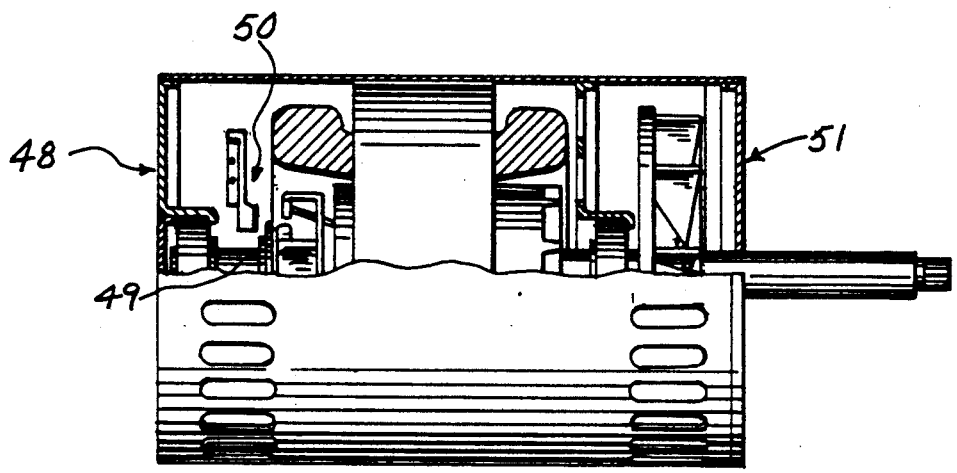
FIG. 4 is a side elevational view with parts broken away to show inner detail of construction of a modified embodiment of the invention.

Although shown as a three compartment motor, other variations of the structure can be readily provided. For example, if a separate control compartment is not required, the one bearing frame 48 can be secured in the outer end of the round main frame 4, such as shown in the construction of FIG. 4. The bearing frame 48 is located projecting inwardly of the frame 4 and with the motor shaft 49 terminates within bearing 11. The centrifugal switch and actuator 50 are appropriately secured to the motor shaft and to the motor frame within the enlarged motor compartment to provide for the appropriate mounting and operation of the switching of the start windings. The opposite end of the frame 4 may be closed by a cap 51, similar to cap 16 of FIG. 2, or a flange cap which is pressed in place.

Figure 5:
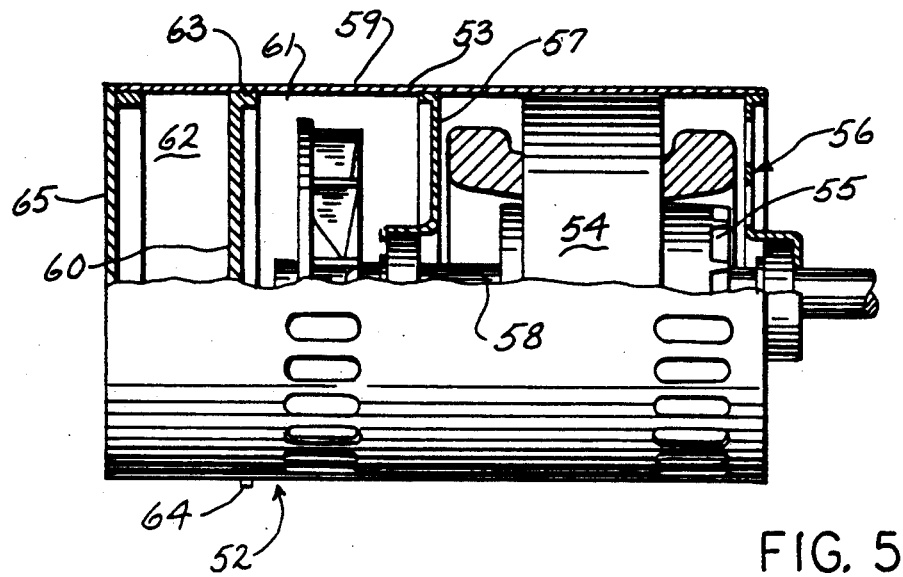
FIG. 5 is a view similar to FIGS. 2 and 4 illustrating a further embodiment of the invention.

In other applications, a motor 52 may be desirably constructed with an internal auxiliary compartment, for example, as shown in FIG. 5. The motor 52 is illustrated including a round frame 53 with a stator unit 54 and a rotor unit 55 located adjacent one end of the frame 53. An end bearing frame 56 is secured to the one end of frame 53 and a second bearing frame 57 is secured within the frame 53 and in spaced relation to the opposite end. The rotor shaft 58 is journaled in the bearing frames and projects outwardly of frame 56 for load connection. The shaft 56 also projects from the inner frame 57 with a fan 59 mounted thereon. A baffle plate 60 is secured within frame 4 in spaced relation to frame 57 and forms a fan chamber or compartment 61 and an outer auxiliary compartment 62 within the outer end of frame 4. The baffle plate 60 is formed as a dish or cup-shaped member having a securement flange 63 press fitted within the round frame 53, and then suitably secured in place as by set screws 69 is access to chamber 60 is desired, by welding if access is not desired, or other suitable devices.

The outer end of the frame 53 and chamber 62 is closed by a cap 65. The compartment 62 may again form a control or connecting compartment for control devices, not shown.

Other motor applications may not require forced cooling in which event the fan unit and the associated compartment can be eliminated and the motor formed as a two compartment motor, generally as in FIG. 4. Thus, the motor is shown as a particular three-compartment motor in FIGS. 2 and 5, and a two-compartment motor in FIG. 4, other compartment variations can be provided as required by appropriately located internal bearing plates and baffles, or dividing walls, as required.

Further, in the broadest aspect of this invention, the internal bearing frame or baffle wall may be formed as a dished construction and inserted as a press fit unit within the motor frame and the outer end members formed of a conventional construction and similarly secured in place using tie bolts or other conventional attachment systems.

Although the end frames and walls are shown as a cup-shaped member defining securement flanges, any other suitable wall structure may be used. Thus, the internal walls may have edge opening to receive attachment pins, screws or the like.

In summary, the present invention provides a multi compartment motor structure including a separate motor chamber or compartment defined by end bearing members secured within an integral round frame in combination with one or more separate compartments for motor controls and/or auxiliary equipment in accordance with application specifications.

Various modes of carrying out the invention are comtemplated as being within the scope of the following claims and particularly pointing out and distinctly claiming the subject matter which is regarded as the invention.

I claim:

1. An electric motor comprising
an outer tubular round frame formed of self-supporting rigid material,
an annular stator unit having magnetic core secured centrally of said frame, a winding wound in said core and projecting from the core and terminating in inwardly spaced relation to the core, a rotor unit including a magnetic core aligned with said magnetic core of said stator and having a shaft projecting from the opposite ends of said magnetic core of said rotor unit,
first and second bearing frames secured within said round frame to define a motor compartment and including bearings, and said shaft being journaled in said bearings, and
an end wall member secured to the first end of said tubular round frame in spaced relation to the first bearing frame and defining a control compartment adjacent said bearing frame and said motor compartment, and
a second end wall member secured to the second end of said tubular round frame in spaced relation to said second bearing frame and defining an auxiliary compartment, said shaft projecting from said core unit through said auxiliary compartment, and including a pump unit having a pump shaft secured to said motor shaft, said pump unit having an end wall member including a mounting flange projecting into the tubular round frame and defining said second wall member closing the auxiliary compartment, said tubular round frame having openings in alignment with the auxiliary compartment to form a drip compartment for discharge of liquid passing from the pump unit into said compartment.

2. An dynamoelectric machine comprising
an outer single tubular round frame formed of rigid supporting material,
an annular magnetic core unit including a winding and an annular core fixedly secured to the inner wall of said round frame in spaced relation to the ends of said frame,
a cylindrical magnetic core unit located within said annular magnetic core unit, and a shaft projecting from said cylindrical magnetic core unit,
a first bearing frame secured within said tubular round frame to define a first end of a compartment within said frame, a second bearing frame secured within said tubular round frame in spaced relation to said first bearing frame to define the second end of the compartment,
said round bearing frames are secured within said tubular round frame in spaced relation to the ends of said tubular motor frame, first and second end closure members secured to the opposite ends of said tubular round frame to define first and second auxiliary chambers to the opposite sides of said motor compartment, a plurality of control devices located in said first auxiliary compartment, and a fan unit in said second auxiliary compartment, and said fan unit establishing air flow through said machine.

* * * * *